US010952038B2

United States Patent
Patil et al.

(10) Patent No.: US 10,952,038 B2
(45) Date of Patent: Mar. 16, 2021

(54) METHOD AND SYSTEM FOR PROVIDING CALENDAR SERVICES IN A UNIVERSAL PLUG AND PLAY HOME NETWORK ENVIRONMENT

(75) Inventors: Mayuresh Madhukar Patil, Bangalore (IN); Je-Young Maeng, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 595 days.

(21) Appl. No.: 14/006,897

(22) PCT Filed: Mar. 21, 2012

(86) PCT No.: PCT/KR2012/002028
§ 371 (c)(1),
(2), (4) Date: Sep. 23, 2013

(87) PCT Pub. No.: WO2012/128555
PCT Pub. Date: Sep. 27, 2012

(65) Prior Publication Data
US 2014/0010121 A1  Jan. 9, 2014

(30) Foreign Application Priority Data
Mar. 21, 2011  (IN) .............................. 881/CHE/2011

(51) Int. Cl.
  *H04W 4/16*  (2009.01)
  *G06Q 10/10*  (2012.01)
  *H04L 12/28*  (2006.01)
(52) U.S. Cl.
  CPC ............ *H04W 4/16* (2013.01); *G06Q 10/109* (2013.01); *H04L 12/2807* (2013.01)

(58) Field of Classification Search
  CPC ...... H04W 4/12; H04W 4/16; H04L 12/2807; G06Q 10/109
  USPC ......................................................... 709/709
  See application file for complete search history.

(56) References Cited

U.S. PATENT DOCUMENTS 8,930,820 B1 * 1/2015 Elwell ..................... G06F 17/60
                                              705/319
2003/0131142 A1   7/2003 Horvitz et al.
2005/0114493 A1 * 5/2005 Mandato ................ H04L 67/16
                                              709/223

(Continued)

OTHER PUBLICATIONS

PCT/ISA/237 Written Opinion issued on PCT/KR2012/002028 (pp. 4).

(Continued)

*Primary Examiner* — Jason D Recek
(74) *Attorney, Agent, or Firm* — The Farrell Law Firm, P.C.

(57) ABSTRACT

A method and system for providing calendar services in a Universal Plug and Play (UPnP) home network environment is provided. The method includes creating a calendar event in a UPnP calendar when a request for creating the calendar event is received by the TS from one of Telephony Control Points (TelCPs) in the UPnP home network environment; determining whether the created calendar event meets predetermined conditions; and triggering a notification, indicating that the calendar event meets the predetermined conditions, to the TelCPs in the UPnP home network environment when the calendar event meets the predetermined conditions.

26 Claims, 9 Drawing Sheets

(56) References Cited

U.S. PATENT DOCUMENTS

| | | | |
|---|---|---|---|
| 2005/0240680 A1* | 10/2005 | Costa-Requena | H04L 12/2803 709/250 |
| 2006/0036642 A1* | 2/2006 | Horvitz | G06F 21/335 |
| 2006/0059465 A1* | 3/2006 | Kogan | G06F 17/3089 717/121 |
| 2006/0117349 A1* | 6/2006 | Ruhl | H04N 5/44543 725/46 |
| 2006/0168259 A1* | 7/2006 | Spilotro | H04L 63/102 709/229 |
| 2006/0190313 A1* | 8/2006 | Lu | G06Q 10/06311 705/7.19 |
| 2007/0032225 A1* | 2/2007 | Konicek | G07C 9/00182 455/417 |
| 2007/0149214 A1* | 6/2007 | Walsh | H04L 12/1859 455/456.1 |
| 2007/0168892 A1* | 7/2007 | Brush | G06Q 10/109 715/751 |
| 2007/0203979 A1* | 8/2007 | Walker | H04M 7/0069 709/204 |
| 2007/0260989 A1* | 11/2007 | Vakil | G06Q 10/109 715/748 |
| 2007/0282654 A1* | 12/2007 | Sarkar | G06Q 10/063116 705/7.16 |
| 2008/0005168 A1* | 1/2008 | Huff | G06F 17/30 |
| 2008/0008114 A1* | 1/2008 | Kaarela | H04M 1/72527 370/328 |
| 2008/0046311 A1* | 2/2008 | Shahine | G06Q 10/109 705/14.57 |
| 2008/0120422 A1* | 5/2008 | Park | H04L 67/025 709/229 |
| 2008/0133708 A1* | 6/2008 | Alvarado | G06Q 10/109 709/218 |
| 2008/0150959 A1* | 6/2008 | Marui | G06F 3/0481 345/594 |
| 2008/0155567 A1* | 6/2008 | O'Shaughnessy | G06Q 10/109 719/321 |
| 2008/0235681 A1* | 9/2008 | Barnett | H04L 67/1095 717/178 |
| 2009/0029724 A1* | 1/2009 | Hardy | G06Q 10/109 455/466 |
| 2009/0036148 A1* | 2/2009 | Yach | G06Q 10/109 455/457 |
| 2009/0089342 A1* | 4/2009 | Runstedler | G06Q 10/109 |
| 2009/0089399 A1* | 4/2009 | Beck | H04L 65/1069 709/218 |
| 2009/0170532 A1* | 7/2009 | Lee | H04M 1/72566 455/456.3 |
| 2009/0187618 A1* | 7/2009 | Maeng | H04L 12/2825 709/201 |
| 2009/0204464 A1* | 8/2009 | Mujkic | G06Q 10/109 705/7.19 |
| 2009/0248480 A1* | 10/2009 | Miksovsky | G06Q 10/109 705/7.19 |
| 2010/0010944 A1* | 1/2010 | Cheng | G06F 17/30032 706/12 |
| 2010/0040221 A1 | 2/2010 | Mitra | |
| 2010/0094529 A1* | 4/2010 | Gupta | G06F 17/30017 701/117 |
| 2010/0161720 A1* | 6/2010 | Colligan | G06Q 30/02 709/203 |
| 2010/0205628 A1* | 8/2010 | Davis | H04M 1/72533 725/25 |
| 2010/0217837 A1* | 8/2010 | Ansari | H04L 12/2818 709/218 |
| 2010/0223131 A1* | 9/2010 | Scott | G06Q 30/02 705/14.53 |
| 2010/0284398 A1* | 11/2010 | Maeng | H04L 12/2838 370/352 |
| 2011/0029653 A1* | 2/2011 | Stein | H04L 12/2801 709/223 |
| 2011/0130958 A1* | 6/2011 | Stahl | G01C 21/362 701/533 |
| 2011/0153380 A1* | 6/2011 | Velusamy | G06Q 10/109 705/7.19 |
| 2011/0225417 A1* | 9/2011 | Maharajh | G06F 21/10 713/150 |
| 2011/0320230 A1* | 12/2011 | Podgurny | G06Q 10/06 705/7.13 |
| 2012/0028615 A1* | 2/2012 | Sundaramurthy | H04M 3/42161 455/412.2 |
| 2012/0036220 A1* | 2/2012 | Dare | G06F 8/61 709/217 |
| 2012/0112908 A1* | 5/2012 | Prykari | H04L 67/325 340/540 |
| 2012/0189000 A1* | 7/2012 | Rahman | H04L 65/1026 370/352 |
| 2012/0233651 A1* | 9/2012 | Lee | H04N 21/4122 725/110 |
| 2013/0097281 A1* | 4/2013 | Boudreau | G06Q 10/107 709/217 |

OTHER PUBLICATIONS

PCT/ISA/210 Search Report issued on PCT/KR2012/002028 (pp. 4).

Korean Office Action dated Mar. 8, 2018 issued in counterpart application No. 10-2013-7027683, 13 pages.

* cited by examiner

[Fig. 1]

[Fig. 8]
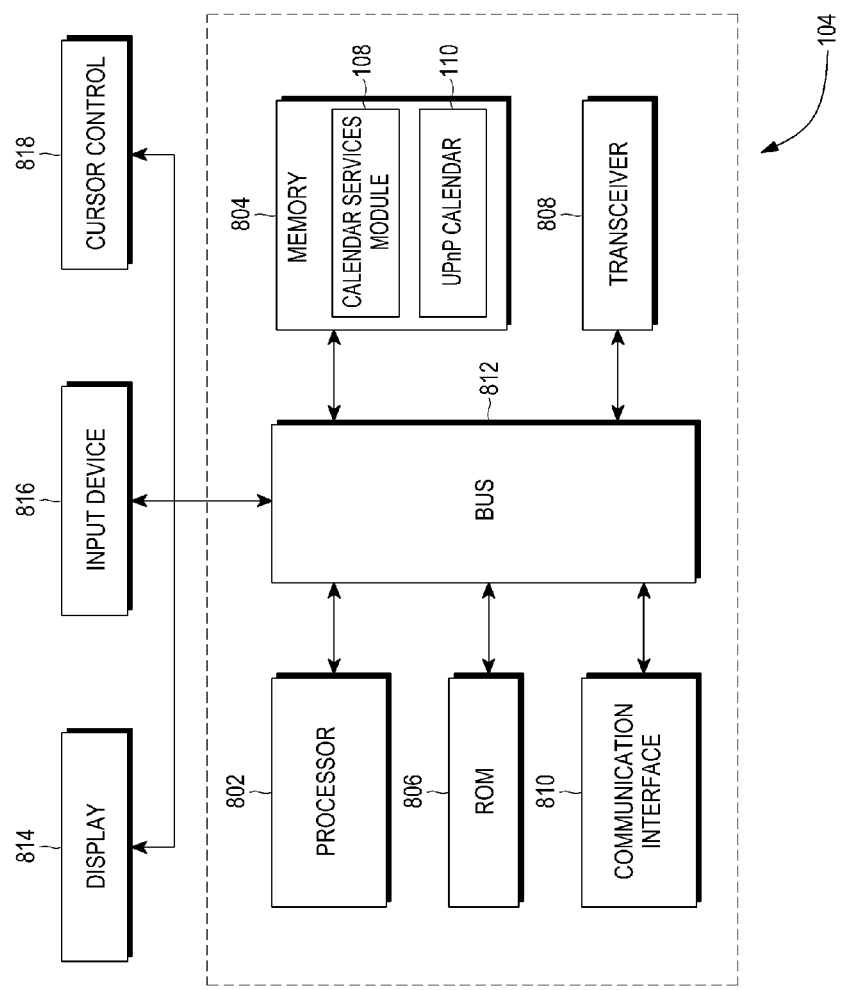

[Fig. 9]
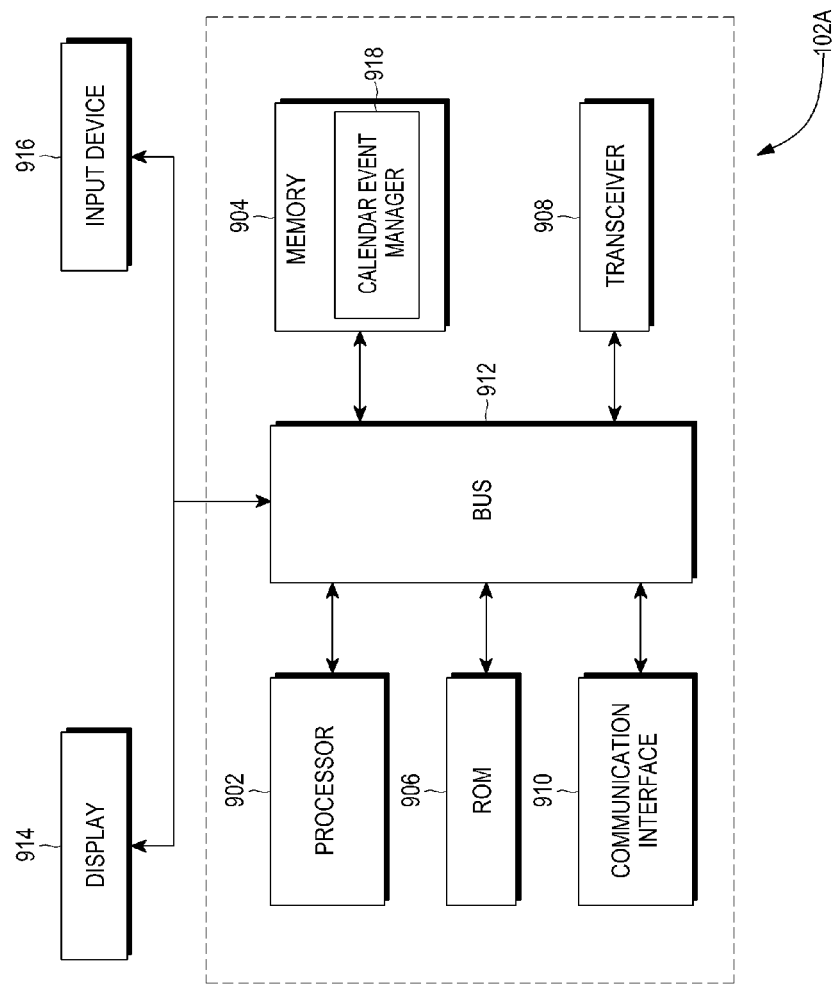

METHOD AND SYSTEM FOR PROVIDING CALENDAR SERVICES IN A UNIVERSAL PLUG AND PLAY HOME NETWORK ENVIRONMENT

PRIORITY

This application is a National Phase Entry of PCT International Application No. PCT/KR2012/002028, which was filed on Mar. 21, 2012, and claims priority to Indian Patent Application No. 881/CHE/2011, which was filed in the Indian Industrial Property Office on Mar. 21, 2011, the content of each of which is incorporated herein by reference.

1. FIELD OF THE INVENTION

The present invention relates generally to the field of Universal Plug and Play (UPnP) home network systems, and more particularly to providing calendar services in a UPnP home network environment.

2. DESCRIPTION OF THE RELATED ART

Universal Plug and Play (UPnP) is a set of computer network protocols promulgated by the UPnP forum. The goals of UPnP are to allow access to connect seamlessly and to simplify implementation of networks in home (e.g., data sharing, communications, and entertainment) and corporate environments. These goals are achieved by defining and publishing UPnP device control protocols built upon open, Internet-based communication standards.

The UPnP technology can cater to a wide range of devices in a home network and provides discovery, control and eventing mechanisms. Using these mechanisms, UPnP makes availability and unavailability of the UPnP devices on the fly to the other devices in the UPnP home network.

UPnP architecture allows peer-to-peer networking of personal computers (PCs), networked appliances, and wireless devices. It is distributed, open architecture based on established standards such as Transport Control Protocol/Internet Protocol (TCP/IP), User Datagram Protocol (UDP), HyperText Transfer Protocol (HTTP) and eXtended Mark-up Language (XML). The UPnP architecture supports zero configuration networking. For example, a UPnP compatible device from any vendor can dynamically join a network, obtain an Internet Protocol (IP) address, announce its name, convey its capabilities upon request, and learn about the presence and capabilities of other devices. On the other hand, the UPnP devices can leave the UPnP home network automatically without leaving any unwanted state information.

The foundation for UPnP networking is Internet Protocol (IP) addressing. Each UPnP device includes a Dynamic Host Configuration Protocol (DHCP) client which searches for a DHCP server when the UPnP device is first connected to the UPnP network. If no DHCP server is available, the UPnP device assigns itself an IP address. If during the DHCP transaction, the UPnP device obtains a domain name, for example, through a Domain Name System (DNS) server or via DNS forwarding, the UPnP device uses that name in subsequent network operations, otherwise the UPnP device uses its own IP address.

The UPnP forum also provides telephony services for extending user experience in a home to access telephony services like messaging service, presence service, and call handling (PS/CS call) service. As analogous to UPnP Device Architecture (DA), the UPnP telephony defines three kinds of devices, viz. a Telephony Server (TS) that provides messaging, and presence related services to the user, a Telephony Control Point (TelCP) to initiate actions provided by the TS, and a Telephony Client device (TC) for media related handling and providing input and output to/from the TS.

However, presently, the UPnP forum does not provide calendar services inside an UPnP home network environment.

SUMMARY OF THE INVENTION

The present invention has been made to address at least the problems and/or disadvantages described above and to provide at least the advantages described below. Accordingly, an aspect of the present invention provides a method and system for providing calendar services in a UPnP home network environment.

According to an aspect of the present invention, there is provided a method for providing calendar services in a Universal Plug and Play (UPnP) home network environment by a Telephony Server (TS). The method includes creating a calendar event in a UPnP calendar when a request for creating the calendar event is received by the TS from one of Telephony Control Points (TelCPs) in the UPnP home network environment; determining whether the created calendar event meets predetermined conditions; and triggering a notification, indicating that the calendar event meets the predetermined conditions, to the TelCPs in the UPnP home network environment when the calendar event meets the predetermined conditions.

According to another aspect of the present invention, there is provided a Telephony Server (TS) including a processor; and a memory coupled to the processor, wherein the memory includes a calendar services module configured to: create a calendar event in a Universal Plug and Play (UPnP) calendar when a request for creating the calendar event is received from one of Telephony Control Points (TelCPs) in a UPnP home network environment; determine whether the created calendar event meets predetermined conditions; and trigger a notification, indicating that the calendar event meets the predetermined conditions, to the TelCPs in the UPnP home network environment when the calendar event meets the predetermined conditions.

According to another aspect of the present invention, there is provided a method for managing calendar events in a Universal Plug and Play (UPnP) home network environment by a Telephony Control Point (TelCP). The method includes triggering a request to create a calendar event in a UPnP calendar stored in a Telephony Server (TS); receiving a notification indicating that the calendar event created in the UPnP calendar meets predetermined conditions; and displaying the notification indicating that the calendar event created in the UPnP calendar meets the predetermined conditions on a display device.

According to another aspect of the present invention, there is provided a Telephony Control Point (TelCP) including a processor; a display unit; and a memory coupled to the processor, wherein the memory includes a calendar event manager configured to: trigger a request to create a calendar event in a Universal Plug and Play (UPnP) calendar stored in a Telephony Server (TS); receive a notification indicating that the calendar event created in the UPnP calendar meets predetermined conditions; and display the notification indicating that the calendar event created in the UPnP calendar meets the predetermined conditions on the display unit.

BRIEF DESCRIPTION OF THE DRAWINGS

The above and other aspects, features, and advantages of certain embodiments of the present invention will be more apparent from the following detailed description taken in conjunction with the accompanying drawings, in which:

FIG. 8 illustrates a block diagram of a telephony server (TS), showing various components for implementing embodiments of the present invention; and FIG. 9 illustrates a block diagram of a TelCP), showing various components for implementing embodiments of the present invention.

DETAILED DESCRIPTION OF EMBODIMENTS OF THE PRESENT INVENTION

Various embodiments of the present invention will now be described in detail with reference to the accompanying drawings. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
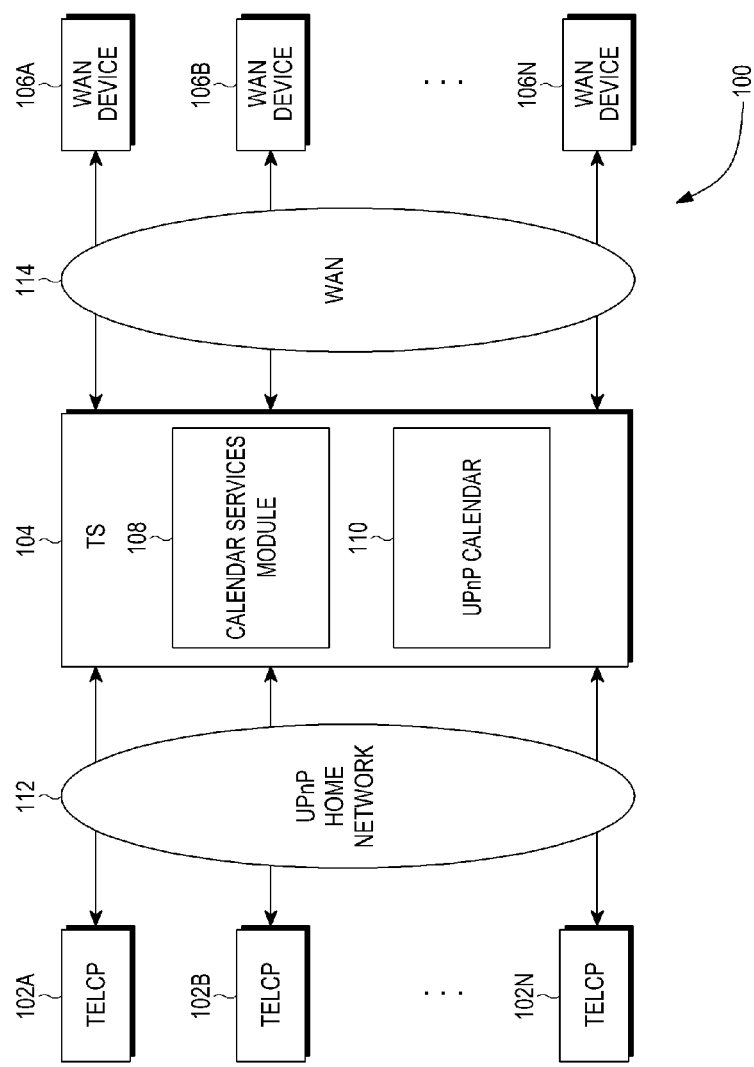
FIG. 1 is a block diagram of a system for providing calendar services in a Universal Plug and Play (UPnP) home network environment, according to an embodiment of the present invention.

FIG. 1 is a block diagram of a system 100 for providing calendar services in a Universal Plug and Play (UPnP) home network environment, according to an embodiment of the present invention. Referring to FIG. 1, the system 100 includes Telephony Control Points (TelCPs) 102A-N, a Telephony Server (TS) 104, and Wide Area Network (WAN) devices 106A-N. The TS 104 includes a calendar services module 108 and a UPnP calendar 110 (e.g., calendar objects which store calendar events). As shown, the TelCPs 102A-N are connected to the TS 104 via a UPnP home network 112. The TS 104 is connected to the WAN devices 106A-N via a WAN 114.

In an embodiment of the present invention, the calendar services module 108 enables the TelCP 102A to create a calendar event in the UPnP calendar 110. A calendar event may be associated with, for example, a birthday, a wedding, a personal meeting, an official meeting, a party function and the like. Upon creating the calendar event, the calendar services module 108 notifies the TelCPs 102A-N that the calendar event has been created in the UPnP calendar 110. Also, the calendar services module 108 synchronizes the calendar event with existing family calendar events stored in the UPnP calendar 110.

Further, the calendar services module 108 periodically checks whether the calendar event meets predetermined conditions based on the date and time of the calendar event and a current date and time. Accordingly, the calendar services module 110 delivers a notification to the TelCPs 102A-N indicating that the calendar event is due so that each of the TelCPs 102A-N displays the notification to its corresponding user. Additionally, the calendar services module 108 enables the user(s) of TelCPs 102A-N to modify or delete the existing calendar events. Moreover, the calendar services module 108 enables the user(s) of the TelCPs 102A-N to retrieve the family calendar events created in the UPnP calendar 110. Furthermore, the calendar services module 108 enables the user(s) of the TelCPs 102A-N to fetch triggered calendar events from the UPnP calendar 110.

Figure 2:
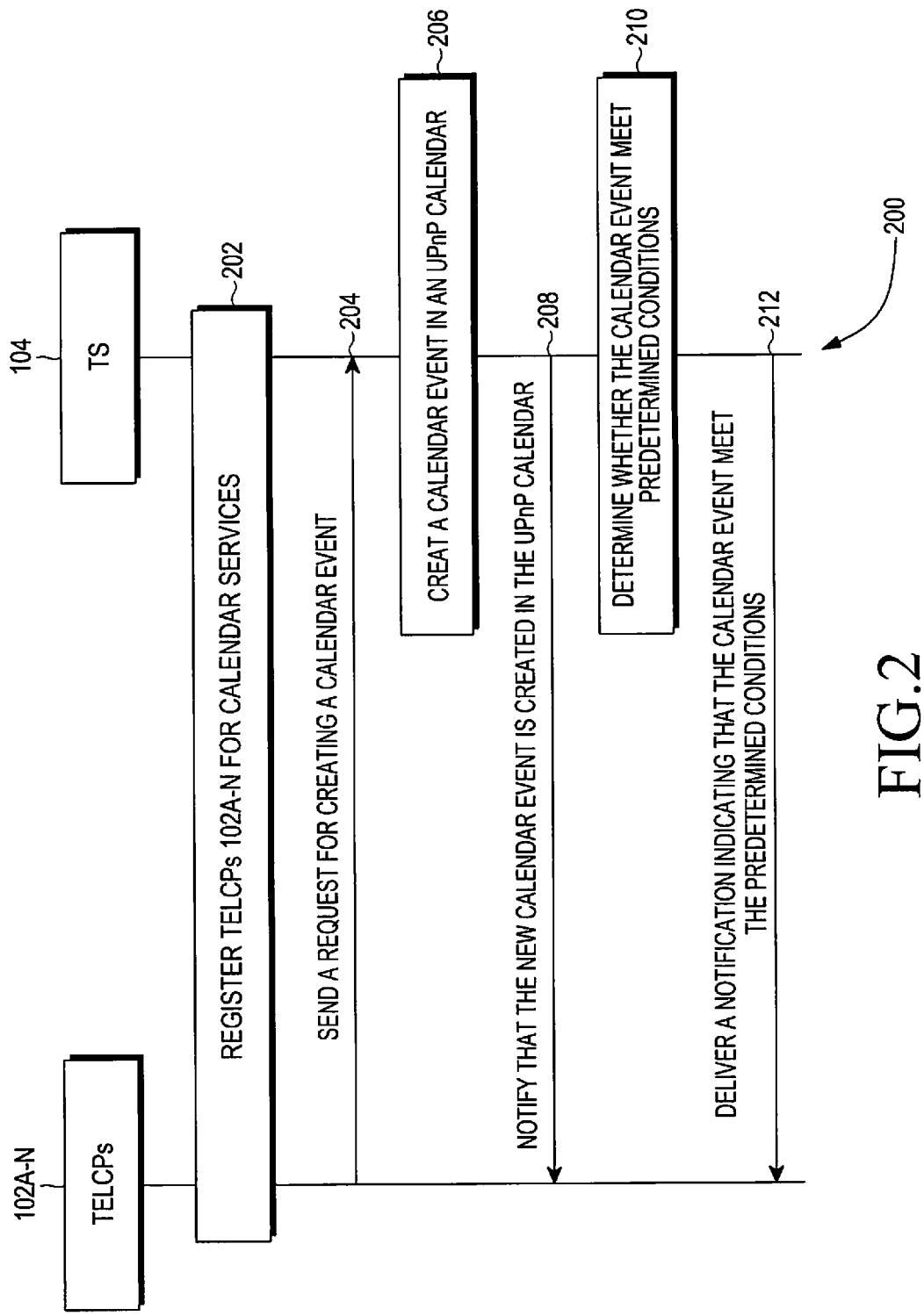
FIG. 2 is a flow diagram illustrating a method of providing a notification to Telephony Control Points (TelCPs) when a calendar event created in a UPnP calendar meets predetermined conditions, according to an embodiment of the present invention.

FIG. 2 is a flow diagram 200 illustrating a method of providing a notification to the TelCPs 102A-N when a calendar event created in the UPnP calendar 110 meets predetermined conditions, according to an embodiment of the present invention. In step 202, the TS 104 registers the TelCPs 102A-N for calendar services based on a request from the TelCPs 102A-N. In step 204, one of the registered TelCPs 102A-N sends a request for creating a calendar event to the TS 104. For example, the request for creating the calendar event includes an identifier associated with said one of the TelCPs, a name of the calendar event, and a time and a date associated with the calendar event. The one of the TelCPs uses 'AddCalendarItems( )' action with input argument 'A_ARG_TYPE_CalItems' and output argument 'A_ARG_TYPE_ItemIDs' for requesting creation of a calendar event in the UPnP calendar 110. The input argument defines the calendar event to be created and the output argument uniquely identifies the calendar events in the 'AddCalendarItems( )'. In step 206, the TS 104 creates the calendar event in the UPnP calendar 110. For example, the TS 104 stores the calendar event in the UPnP calendar 110 in a format defined by [RFC 5545] as shown in Table 1.

TABLE 1

```
<?xml version="1.0" encoding="UTF-8"?>
<calendar:calendarItems
    xsi:schemaLocation="urn:schemas-upnp-org:phone:calendar
    http://www.upnp.org/schemas/phone/calendar-v1.xsd"
 xmlns:xsi="http://www.w3.org/2001/XMLSchema-instance"
 xmlns:calendar="urn:schemas-upnp-org:phone:calendar">
    <calendar:item  ItemID="123"   format="RFC5545"
TelCPIDs="telcpid">
 ... actual event as per RFC 5545.(textual format)
 e.g.
 </calendar:item>
 ---- Any other event parameter will go here -----
 </calendar:calendarItems>
```

In step 208, the TS 104 notifies the TelCPs 102A-N that the new calendar event has been created in the UPnP calendar 110. In step 210, the TS 104 determines whether the calendar event meets predetermined conditions. For example, the predetermined conditions may include the date and time of the calendar event matching a current date and time. Thus, the calendar event is said to meet the predetermined conditions when the date and time associated with the calendar event match the current date and time.

If the calendar event meets the predetermined conditions, then in step 212, the TS 104 triggers a notification indicating that the calendar event meets the predetermined conditions and delivers the triggered notification to each of the registered TelCPs 102A-N. The notification may include an alarm, reminder and free/busy time. In one embodiment, each of the TelCPs 102A-N may display the notification associated with the calendar event on the display (e.g., display 914 of FIG. 9). In another embodiment, each of the TelCPs 102A-N may activate an audio alarm upon receiving the triggered notification.

Figure 3:
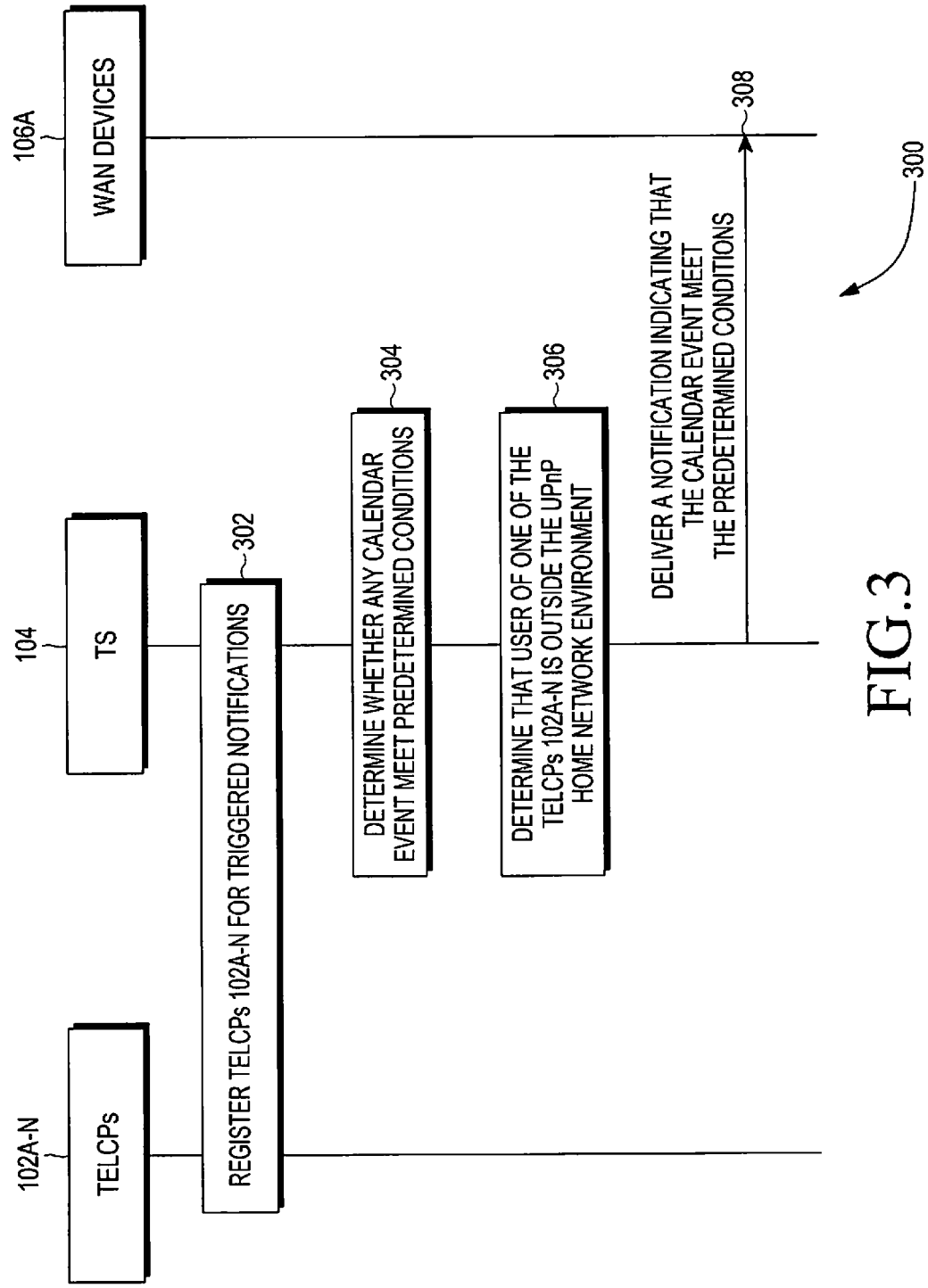
FIG. 3 is a flow diagram illustrating a method of providing a notification to a user associated with the TelCPs on one of Wireless Area Network (WAN) devices when the user is outside of the UPnP home network environment, according to an embodiment of the present invention.

FIG. 3 is a flow diagram 300 illustrating a method of providing a notification to a user associated with the TelCPs 102A-N on one of the WAN devices 106A-N when the user is outside the UPnP home network environment, according to an embodiment of the present invention. A user associated with the TelCPs 102A-N may wish to register for notifications when the user is connected to the UPnP home network via the TelCPs. For example, the TelCP 102A may use 'RegisterItemDelivery ( )' with input argument 'ItemDeliveryMethod' to register for delivery of triggered notifications when the user is outside the UPnP home network environment. The user may want to receive a memo or triggered notifications on a mobile device while the user is outside of the UPnP home network environment. The input argument 'ItemDeliveryMethod' indicates an address (e.g., email address, IP address) and a delivery mechanism by which the user wishes to receive memo or triggered notifications when the user is outside the UPnP home network environment. An exemplary schema of the input argument 'ItemDeliveryMethod' is depicted in Table 2.

TABLE 2

```
<?xml version="1.0" encoding="utf-8"?>
<calendar:ItemDeliveryMethod
    xsi:schemaLocation="urn:schemas-upnp-org:phone:calendar
    http://www.upnp.org/schemas/phone/calendar-v1.xsd"
    xmlns:xsi="http://www.w3.org/2001/XMLSchema-instance"
    xmlns:cams="urn:schemas-upnp-org:phone:calendar">
    <calendar:deliveryMethod itemID="CalendarID">
            <calendar:email>email address</calendar:email>
            <!-- Any other email address (if any) go here.-->
                <calendar:sms>tell uri</calendar:sms>
            <!-- Any other sms id (if any) go here.-->
                <calendar:sip>tell uri</calendar:sip>
            <!-- Any other sip address (if any) go here.-->
                <calendar:sns>
                    <calendar:snsName>name of the social network service</calendar:snsName>
                    <calendar:snsID>user id of the social network service</calendar:snsID>
                </calendar:sns>
            <!-- Any other sns address (if any) go here.-->
        </calendar:deliveryMethod>
</calendar:ItemDeliveryMethod>
```

One of ordinary skill in the art will understand that, the user can select more than one delivery method such Short Message Service (SMS) message, Session Initiation protocol (SIP), and email, etc.

In such case, in step 302, the TS 102 registers the user for the triggered notification associated with the calendar event on a WAN device (e.g., WAN device 106A). In step 304, the TS 104 periodically determines whether any calendar event created in the UPnP calendar 110 meets the predetermined conditions. If any calendar event meets the predetermined conditions, then, in step 306, the TS 104 determines whether the registered user associated with the TelCPs 102A-N is outside of the UPnP home network environment. In such case, the TS 104 sends, in step 308, the triggered notification, indicating that the calendar event created in the UPnP calendar 110 meets the predetermined conditions, to the WAN device 106A associated with the registered user through an Instant Message, Email, etc. via the WAN 114. Alternatively, the TS 104 may deliver the notification associated with the triggered calendar event on a handheld device associated with the user via an SMS message using a cell phone number associated with the registered user.

Figure 4:
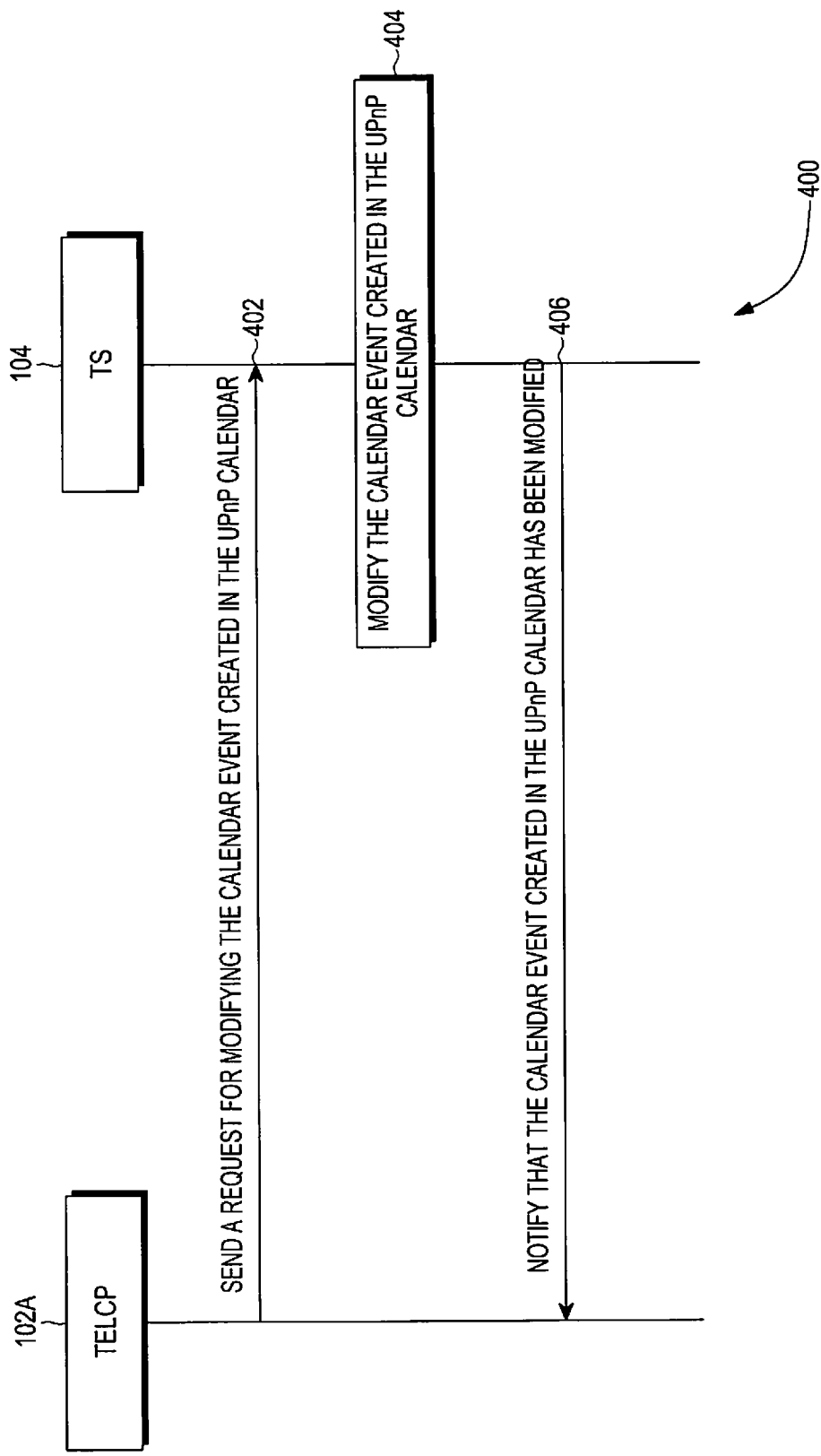
FIG. 4 is a flow diagram illustrating a method of modifying the calendar event created in the UPnP calendar, according to an embodiment of the present invention.

FIG. 4 is a flow diagram 400 illustrating a method of modifying the calendar event created in the UPnP calendar 110, according to an embodiment of the present invention. In an event in which the user of TelCP 102A wishes to modify the information associated with the calendar event created in the UPnP calendar 110, the TelCP 102A sends, in step 402, a request for modifying the calendar event created in the UPnP calendar 110. Information associated with the calendar event may include date information, time information, name of the calendar event, priority and status associated with the calendar event, and description associated with the calendar event. For example, the TelCP 102 may use 'UpdateCalendarItems( )' action with input argument 'A_ARG_TYPE_CallItems' for modifying the calendar event created in the UPnP calendar 110. The input argument 'A_ARG_TYPE_CallItems' identifies the identifier associated with the calendar event to be modified.

In step 404, the TS 104 modifies and stores the information associated with the calendar event created in the UPnP calendar 110 based on the request from the TelCP 102A. In step 406, the TS 104 sends a notification to the TelCPs 102A-N indicating that the information associated with the calendar event has been successfully modified by the TelCP 102A.

Figure 5:
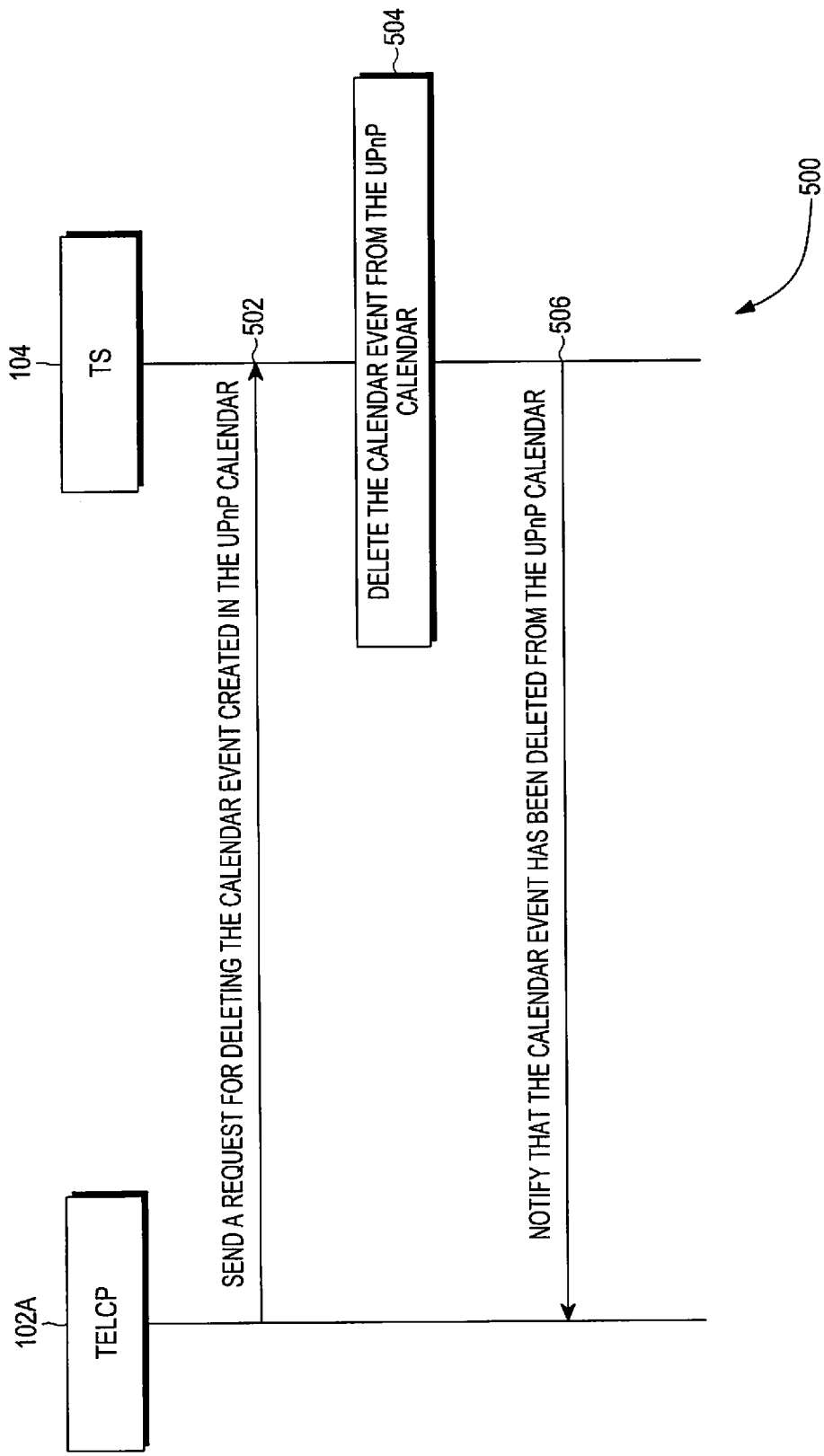
FIG. 5 is a flow diagram illustrating a method of deleting the calendar event created in the UPnP calendar, according to an embodiment of the present invention.

FIG. 5 is a flow diagram 500 illustrating a method of deleting the calendar event created in the UPnP calendar 110, according to an embodiment of the present invention. In an event in which the user of TelCP 102A wishes to delete the calendar event created in the UPnP calendar 110, the TelCP 102A sends, in step 502, a request for deleting the calendar event created in the UPnP calendar 110. For example, the TelCP 102A uses 'DeleteCalendarItems( )' action with input argument 'A_ARG_TYPE_ItemIDs' for requesting a delete operation. The input argument 'A_ARG_TYPE_ItemIDs' identifies the identifier associated with the calendar event to be deleted from the UPnP calendar 110.

In step 504, the TS 104 deletes the calendar event from the UPnP calendar 110 based on the request from the TelCP 102A. In step 506, the TS 104 sends a notification to the TelCPs 102A-N indicating that the calendar event has been successfully deleted by the TelCP 102A.

Figure 6:
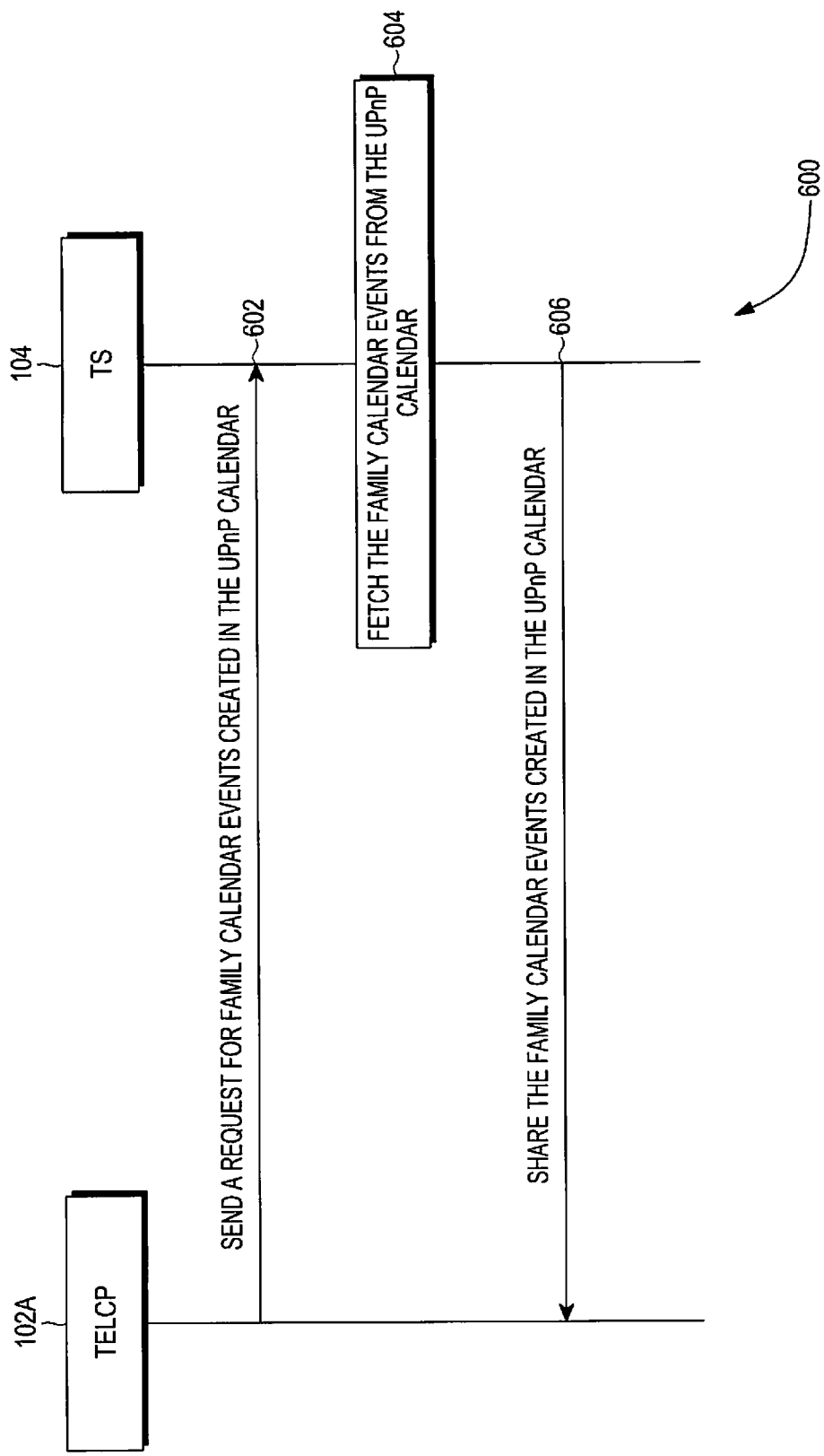
FIG. 6 is a flow diagram illustrating a method of fetching family calendar events created in the UPnP calendar, according to an embodiment of the present invention.

FIG. 6 is a flow diagram 600 illustrating a method of fetching family calendar events created in the UPnP calendar 110, according to an embodiment of the present invention. In an event in which the user of TelCP 102A wishes to fetch family calendar events created in the UPnP calendar 110, the TelCP 102A sends, in step 602, a request for the family calendar events created in the UPnP calendar 110. The family calendar events include calendar events created by the users of the UPnP home network environment. For example, the TelCP 102A uses 'GetCalendarItems ( )' with input argument 'ItemIDs' and output argument 'CallItems' for fetching existing family calendar events created in the UPnP calendar 110. The input argument 'ItemIDs' indicates an identifier associated with the calendar events to be retrieved from the UPnP calendar 110 while the output argument 'CallItems' includes calendar events requested by the TelCP 102A. In step 604, the TS 104 fetches the family calendar events from the UPnP calendar 110 based on the request from the TelCP 102A. In step 606, the TS 104 shares the family calendar events created in the UPnP calendar 110 with the TelCP 102A.

Figure 7:
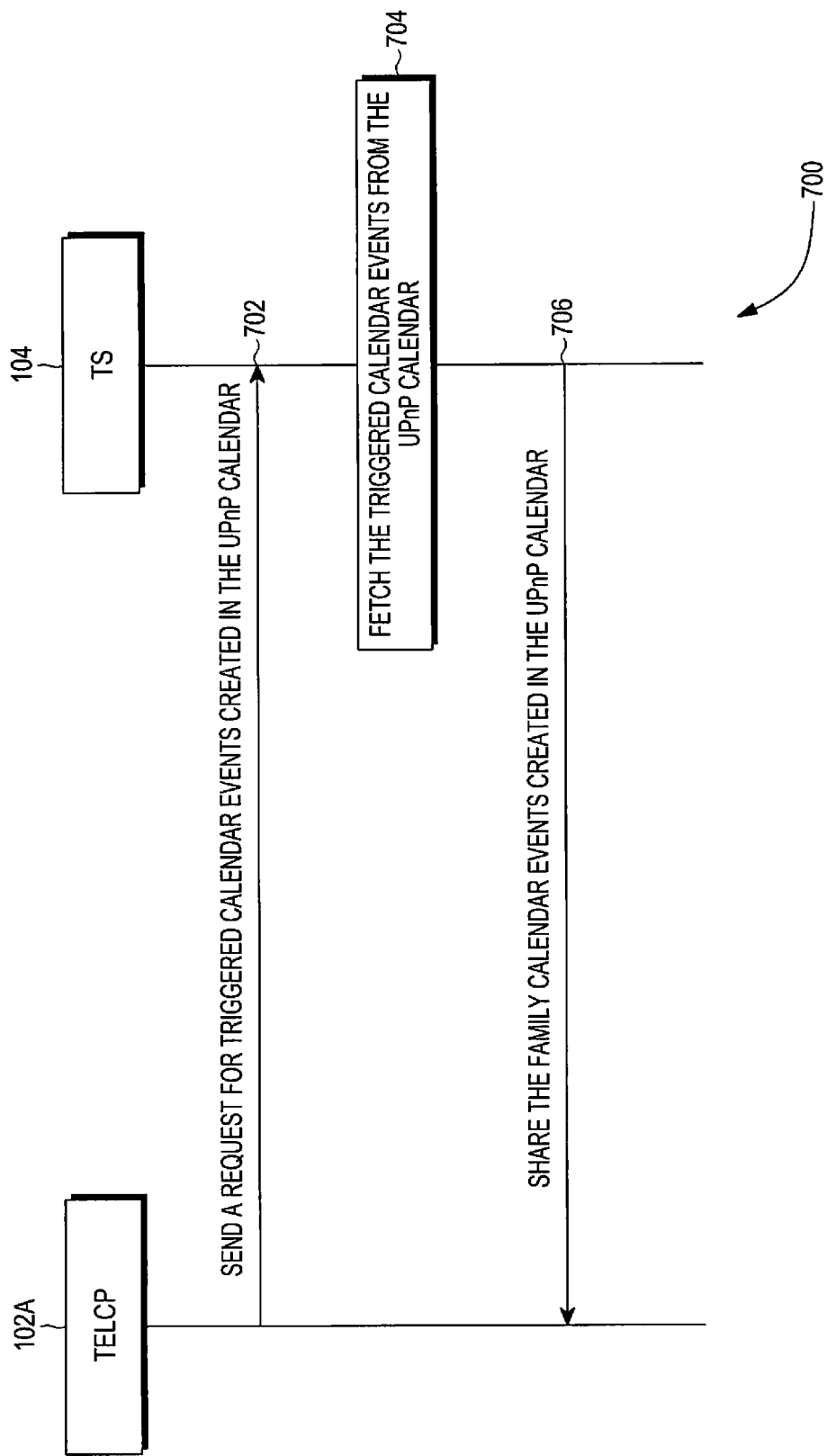
FIG. 7 is a flow diagram illustrating a method of retrieving triggered calendar events created in the UPnP calendar, according to an embodiment of the present invention.

FIG. 7 is a flow diagram 700 illustrating a method of fetching triggered calendar events created in the UPnP calendar 110, according to an embodiment of the present invention. In an event in which the user of TelCP 102A wishes to retrieve the calendar events which are triggered upon meeting the predetermined conditions, the TelCP 102A sends, in step 702, a request for the triggered calendar events created in the UPnP calendar 110. The triggered calendar events include calendar events created by the users of the UPnP home network environment and triggered upon meeting the predetermined conditions. In other words, the triggered calendar events include events which have already been triggered in the past.

For example, the TelCP 102A uses 'GetTriggeredItems ( )' with output argument 'TriggeredItemIDs' for retrieving existing triggered calendar events created in the UPnP calendar 110. The output argument 'TriggeredItemIDs' indicates an identifier associated with the triggered calendar events to be retrieved from the UPnP calendar 110. A structure of the output argument 'TriggeredItemIDs' is depicted in Table 3.

TABLE 3

```
<?xml version="1.0" encoding="UTF-8"?>
<calendar:triggeredItem
    xsi:schemaLocation="urn:schemas-upnp-org:phone:calendar
    http://www.upnp.org/schemas/phone/calendar-v1.xsd"
  xmlns:xsi="http://www.w3.org/2001/XMLSchema-instance"
  xmlns:calendar="urn:schemas-upnp-org:phone:calendar">
  <calendar:itemID>123<calendar:itemID/>
  ...
  <calendar:itemID>456<calendar:itemID/>
</calendar:triggeredItem>
```

In step 704, the TS 104 retrieves the triggered calendar events from the UPnP calendar 110 based on the request from the TelCP 102A. In step 706, the TS 104 shares the triggered calendar events created in the UPnP calendar 110 with the TelCP 102A.

FIG. 8 illustrates a block diagram of the TS 104 showing various components for implementing embodiments of the present invention. Referring to FIG. 8, the TS 104 includes a processor 802, memory 804, a Read Only Memory (ROM) 806, a transceiver 808, a communication interface 810, a bus 812, a display 814, an input device 816, and a cursor control 818.

The processor 802, as used herein, refers to any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 802 may also include embedded controllers, such as generic or programmable logic devices or arrays, application specific integrated circuits, single-chip computers, smart cards, and the like.

The memory 804 may be volatile memory and/or non-volatile memory. The memory 804 includes the calendar services module 108 and the UPnP calendar 110. The calendar services module 108 is stored in the memory 804 in the form of instructions, which, when executed by the processor 802, cause the processor 802 to provide calendar services to TelCP users in the UPnP home network environment, according to the embodiments of the present invention. A variety of computer-readable storage media may be stored in and accessed from memory elements. The memory elements may include any suitable memory device(s) for storing data and machine-readable instructions, such as read only memory, random access memory, erasable programmable read only memory, electrically erasable programmable read only memory, hard drive, removable media drive for handling memory cards, Memory Sticks™, and the like.

Embodiments of the present invention may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 802. For example, a computer program may include machine-readable instructions capable of creating/modifying/deleting calendar event and triggering a notification when the calendar event meets predetermined conditions, according to the teachings and herein described embodiments of the present subject matter. In one embodiment, the computer program may be included on a storage medium and loaded from the storage medium to a hard drive in the non-volatile memory.

The components such as the transceiver 808, the communication interface 810, the bus 812, the display 814, the input device 816, and the cursor control 818 are well known to the person skilled in the art and hence the explanation is thereof omitted.

FIG. 9 illustrates a block diagram of the TelCP 102A showing various components for implementing embodiments of the present invention. In FIG. 9, the TelCP 102A includes a processor 902, memory 904, a Read Only Memory (ROM) 906, a transceiver 908, a communication interface 910, a bus 912, a display 914, and an input device 916.

The processor 902, as used herein, refers to any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 902 may also include embedded controllers, such as generic or programmable logic devices or arrays, application specific integrated circuits, single-chip computers, smart cards, and the like.

The memory 904 may be volatile memory and non-volatile memory. The memory 904 includes the calendar event manager 918 in the form of instructions for managing calendar events in the UPnP home network environment, according to the embodiments of the present invention. For example, the calendar event manager 918 may be configured for setting a calendar event in the UPnP calendar 110, modifying/deleting the calendar event stored in the UPnP calendar 110, and displaying a notification on the display 914 when the calendar event meets the predetermined conditions. A variety of computer-readable storage media may be stored in and accessed from memory elements. The memory elements may include any suitable memory device(s) for storing data and machine-readable instructions, such as read only memory, random access memory, erasable programmable read only memory, electrically erasable programmable read only memory, hard drive, removable media drive for handling memory cards, Memory Sticks™, and the like.

Embodiments of the present invention may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 902. For example, a computer program may include machine-readable instructions capable of managing calendar events in an UPnP domain, according to the embodiments of the present invention. In one embodiment, the computer program may be included on a storage medium and loaded from the storage medium to a hard drive in the non-volatile memory.

The components such as the transceiver 908, the communication interface 910, the bus 912, the display 914, and the input device 916 are well known to the person skilled in the art and hence the explanation is thereof omitted.

Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

The invention claimed is:

1. A method for providing calendar services by a telephony server, comprising:
   registering at least one telephony control point (TelCP) for delivery of a triggered notification of a calendar event;
   receiving a request for registering the calendar event from a TelCP, which is connected to the telephony server via a universal plug and play (UPnP) home network, among the registered at least one TelCP;
   registering the calendar event in the calendar services based on the request being received;
   transmitting information notifying that the calendar event is registered in the calendar services, to the TelCP from which the request for the calendar event is received;
   identifying whether the calendar event meets predetermined conditions;
   identifying whether the registered at least one TelCP is inside the UPnP home network or inside a wireless area network (WAN);
   triggering a notification indicating that the calendar event meets the predetermined conditions;
   delivering the triggered notification to the registered at least one TelCP via the UPnP home network when the registered at least one TelCP is inside the UPnP home network; and
   delivering the triggered notification to a WAN device associated with the registered at least one TelCP via the WAN using at least one delivery method when the registered at least one TelCP is inside the WAN,
   wherein the at least one delivery method includes a short message service (SMS) or a session initiation protocol (SIP) address, selected by a user of the TelCP.

2. The method of claim 1, wherein the request for registering the calendar event comprises an identifier associated with one of the registered at least one TelCP a name of the calendar event, and a time and date associated with the calendar event.

3. The method of claim 1, wherein the triggered notification comprises at least one of a reminder, an alarm, or a free/busy time.

4. The method of claim 1, further comprising:
   modifying the registered calendar event when a request for modifying the calendar event is received from one of the registered at least one TelCP.

5. The method of claim 1, further comprising:
   deleting the registered calendar event when a request for deleting the calendar event is received from one of the registered at least one TelCP.

6. The method of claim 1, further comprising:
   synchronizing the registered calendar event with at least one family calendar event registered in the calendar.

7. The method of claim 6, further comprising:
   sharing the at least one family calendar event with TelCP users when the request to fetch the at least one family calendar event is received from one of the registered at least one TelCP.

8. A telephony server comprising:
   a transceiver; and
   at least one processor,
   wherein the at least one processor is configured to:
      register at least one telephony control point (TelCP), which is connected to the telephony server via a universal plug and play (UPnP) home network, for delivery of a triggered notification of a calendar event;
      control the transceiver to receive a request for registering a calendar event from a TelCP among the registered at least one TelCP;
      register the calendar event in calendar services based on the request being received;
      control the transceiver to transmit information notifying that the calendar event is registered in the calendar services, to the TelCP from which the request for the calendar event is received;
      identify whether the calendar event meets predetermined conditions;
      identify whether the registered at least one TelCP is inside the UPnP home network or inside a wireless area network (WAN);
      trigger a notification, indicating that the calendar event meets the at least one predetermined conditions;
      control the transceiver to deliver the triggered notification to the registered at least one TelCP via the UPnP home network when the at least one TelCP is inside the UPnP home network; and
      control the transceiver to deliver the triggered notification to a WAN device associated with the registered at least one TelCP via the WAN using at least one delivery method when the registered at least one TelCP is inside the WAN, wherein the at least one delivery method includes a short message service (SMS) or a session initiation protocol (SIP) address, selected by a user of the TelCP.

9. The telephony server of claim 8, wherein the request for registering the calendar event comprises an identifier associated with one of the registered at least one TelCP, a name of the calendar event, and a time and date associated with the calendar event.

10. The telephony server of claim 8, wherein the triggered notification comprises at least one of a reminder, an alarm, or a free/busy time.

11. The telephony server of claim 8, wherein the at least one processor is further configured to:
modify the registered calendar event when a request for modifying the calendar event is received from one of the registered at least one TelCP.

12. The telephony server of claim 8, wherein the at least one processor is further configured to:
delete the registered calendar event when a request for deleting the calendar event is received from one of the registered at least one TelCP.

13. The telephony server of claim 8, wherein the at least one processor is further configured to:
synchronize the registered calendar event with at least one family calendar event registered in the calendar.

14. The telephony server of claim 13, wherein the at least one processor is further configured to:
share the at least one family calendar event with TelCP users when the request to fetch the at least one family calendar event is received from one of the registered at least one TelCP.

15. A method for managing calendar events by a telephony control point (TelCP), which is connected to the telephony server via a universal plug and play (UPnP) home network, the method comprising:
transmitting a request to register a calendar event in calendar services to a telephony server;
receiving information notifying that the calendar event is registered in the calendar services, from the telephony server;
identifying whether the TelCP is inside the UPnP home network or inside a wireless area network (WAN);
when the TelCP is inside the UPnP home network, receiving, via the UPnP home network, a notification indicating that the calendar event registered in the calendar meets predetermined conditions;
when the TelCP is inside the WAN, receiving, from the telephony server, the notification via the WAN using at least one delivery method; and
displaying the received notification on a display of the TelCP,
wherein the at least one delivery method includes a short message service (SMS) or a session initiation protocol (SIP) address, selected by a user of the TelCP.

16. The method of claim 15, further comprising:
displaying the information on the display of the TelCP.

17. The method of claim 15, further comprising:
modifying the calendar event registered in the calendar.

18. The method of claim 15, further comprising:
deleting the calendar event registered in the calendar.

19. The method of claim 15, further comprising:
retrieving one or more family calendar events registered in the calendar.

20. The method of claim 15, further comprising:
retrieving one or more triggered calendar events from the calendar.

21. A telephony control point (TelCP), which is connected to a telephony server via a universal plug and play (UPnP) home network, the TelCP comprising:
a memory;
a transceiver;
a display; and
at least one processor,
wherein the at least one processor is configured to:
control the transceiver to transmit a request to register a calendar event in calendar services, to a telephony server;
control the transceiver to receive information notifying that the calendar event is registered in the calendar services, from the telephony server;
identify whether the TelCP is inside the UPnP home network or inside a wireless area network (WAN);
when the TelCP is inside the UPnP home network, receive, via the UPnP home network, a notification indicating that the calendar event registered in the calendar meets at least one predetermined condition;
when the TelCP is inside the WAN, receive, from the telephony server, the notification via the WAN using at least one delivery method; and
display the received notification on the display,
wherein the at least one delivery method, includes a short message service (SMS) or a session initiation protocol (SIP) address, selected by a user of the TelCP.

22. The TelCP of claim 21, wherein the at least one processor is further configured to:
display the information on the display.

23. The TelCP of claim 21, wherein the at least one processor is further configured to:
modify the calendar event registered in the calendar.

24. The TelCP of claim 21, wherein the at least one processor is further configured to:
delete the calendar event registered in the calendar.

25. The TelCP of claim 21, wherein the at least one processor is further configured to:
retrieve one or more family calendar events registered in the calendar.

26. The TelCP of claim 21, wherein the at least one processor is further configured to:
retrieve one or more triggered calendar events from the calendar.

* * * * *